(12) United States Patent
Sasaki

(10) Patent No.: US 6,486,973 B1
(45) Date of Patent: Nov. 26, 2002

(54) IMAGE FORMING APPARATUS AND METHOD FOR CORRECTING DENSITY LEVEL OF PIXEL DATA CORRESPONDING TO EACH DOT IN A DOT IMAGE

(75) Inventor: Eiichi Sasaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/184,278

(22) Filed: Nov. 2, 1998

(30) Foreign Application Priority Data

Nov. 4, 1997 (JP) .............................................. 9-302267

(51) Int. Cl.[7] ................................................. G06K 9/48
(52) U.S. Cl. ......................... 358/1.9; 382/274; 358/3.21
(58) Field of Search ................................. 382/254–259, 382/274; 358/1.9, 3.03, 3.13, 3.14, 3.21

(56) References Cited

U.S. PATENT DOCUMENTS 5,995,202 A * 11/1999 Itoh et al. ..................... 355/67
6,026,184 A * 2/2000 Fukushima ................. 358/455

FOREIGN PATENT DOCUMENTS

| DE | 34 32 515 | | 1/1992 | |
|----|-----------|---|--------|---|
| EP | 0581575 | * | 2/1994 | ............ H04N/1/40 |
| EP | 0 674 426 | | 9/1995 | |
| JP | 3-80768 | | 4/1991 | |
| JP | 7-123264 | | 5/1995 | |
| JP | 2000032268 | * | 1/2000 | |

* cited by examiner

Primary Examiner—Thomas D. Lee
Assistant Examiner—Stephen Brinich
(74) Attorney, Agent, or Firm—Oblon, Spivak, McClelland, Maier & Neustadt, P.C.

(57) ABSTRACT

An image forming apparatus corrects pixel data subjected to various dither processes by using correction table information. The image forming apparatus forms a dot image having density gradation represented by a plurality of dots. Conditions of dots surrounding each dot in the dot image is detected. A correction of pixel data corresponding to each dot is performed in accordance with a difference in a density level of the pixel data between each dot and the dots surrounding each dot.

3 Claims, 4 Drawing Sheets

IMAGE FORMING APPARATUS AND METHOD FOR CORRECTING DENSITY LEVEL OF PIXEL DATA CORRESPONDING TO EACH DOT IN A DOT IMAGE

BACKGROUND OF THE INVENTION

The present invention generally relates to an image forming apparatus and, more particularly, to an image forming apparatus such as a color printer or a color copy machine for forming a dot image.

DESCRIPTION OF THE RELATED ART

A dither method or a tone production method by density pattern is well-known as a method for representing a half-tone image by a printer. By using such a method, an image having a screen angle can be formed. Thereby, moire stripes can be eliminated, and uniformity in an average color can be obtained.

However, the dither method or the tone production method by density pattern has a problem in that a resolution in a printed image is decreased as a number of gradation levels is increased by increasing a size of a matrix.

In order to compensate for the above-mentioned drawback, Japanese Laid-Open Patent Application No.3-80768 discloses an image forming apparatus using an image density correcting method using a multi-value dither method. In this method, multi-value image data is corrected by first correcting means, and the corrected multi-value image data is processed by dither processing means. Then, a density characteristic of the multi-value dither data obtained by the dither processing means is corrected by second correcting means in accordance with an output characteristic of a printer. Accordingly, this image forming apparatus can be operated with various printing characteristics.

On the other hand, an image forming apparatus such as a printer must be operate with various pseudo gray scale processes such as dither processes. However, in the above-mentioned conventional image forming apparatus, the density correction is performed by a single $\gamma$-correction means. Thus, the conventional image forming apparatus cannot perform different pseudo gray scale processes.

SUMMARY OF THE INVENTION

It is a general object of the present invention to provide an improved and useful image forming apparatus and method in which the above-mentioned problems are eliminated.

A more specific object of the present invention is to provide an image forming apparatus and method in which pixel data subjected to various dither processes can be corrected with a single correction table.

Another object of the present invention is to provide an image forming apparatus and method in which a reproducibility of a low-density part of a printed image is improved and a density gradation characteristic is stabilized.

In order to achieve the above-mentioned objects, there is provided according to one aspect of the present invention an image forming apparatus for forming a dot image having density gradation represented by a plurality of dots, the image forming apparatus comprising:

detecting means for detecting conditions of dots surrounding each dot in the dot image; and correcting means for correcting pixel data corresponding to each dot in accordance with a difference in a density level of the pixel data between each dot and the dots surrounding each dot.

In the above-mentioned invention, the correcting means may includes means for changing a degree of correction between the dots arranged in the horizontal and vertical directions with respect to each dot and the dots arranged in the diagonal directions with respect to each dot.

Additionally, the correcting means may correct a density level of pixel data corresponding to each dot by using values according to a developing characteristic of the image forming apparatus.

Further, the correcting means may include means for detecting dot information regarding the dots surrounding each dot from level information included in pixel data corresponding to the dots, and for converting the dot information according to previously prepared table information.

Additionally, the correcting means may calculate a correction factor based on dot information with respect to the dots surrounding each dot so as to perform a correction of each dot by using the calculated correction factor.

According to the present invention, a density level of pixel data corresponding to a focused dot is corrected based on a difference in density level between the focused dot and the dots surrounding the focused dot. Thus, an appropriate reproduction of a dot image can be achieved in response to a condition of the dots surrounding the focused dot.

Additionally, a degree of correction is changed between the dots arranged in the horizontal and vertical directions with respect to the focused dot and the dots arranged in the diagonal directions. Thus, for example, a reduction in a thickness of a diagonal line can be compensated for.

Additionally, if the correction factor is calculated after the pixel data corresponding to the dots surrounding the focused dot, an accurate correction can be performed. Further, by performing the correcting operation by using previously prepared table information, a high-speed correcting operation can be achieved.

Other objects, features and advantages of the present invention will become more apparent from the following detailed description when read in conjunction with the accompanying drawings.

DETAILED DESCRIPTION OF THE PREFERRED EMBODIMENTS

Figure 1:
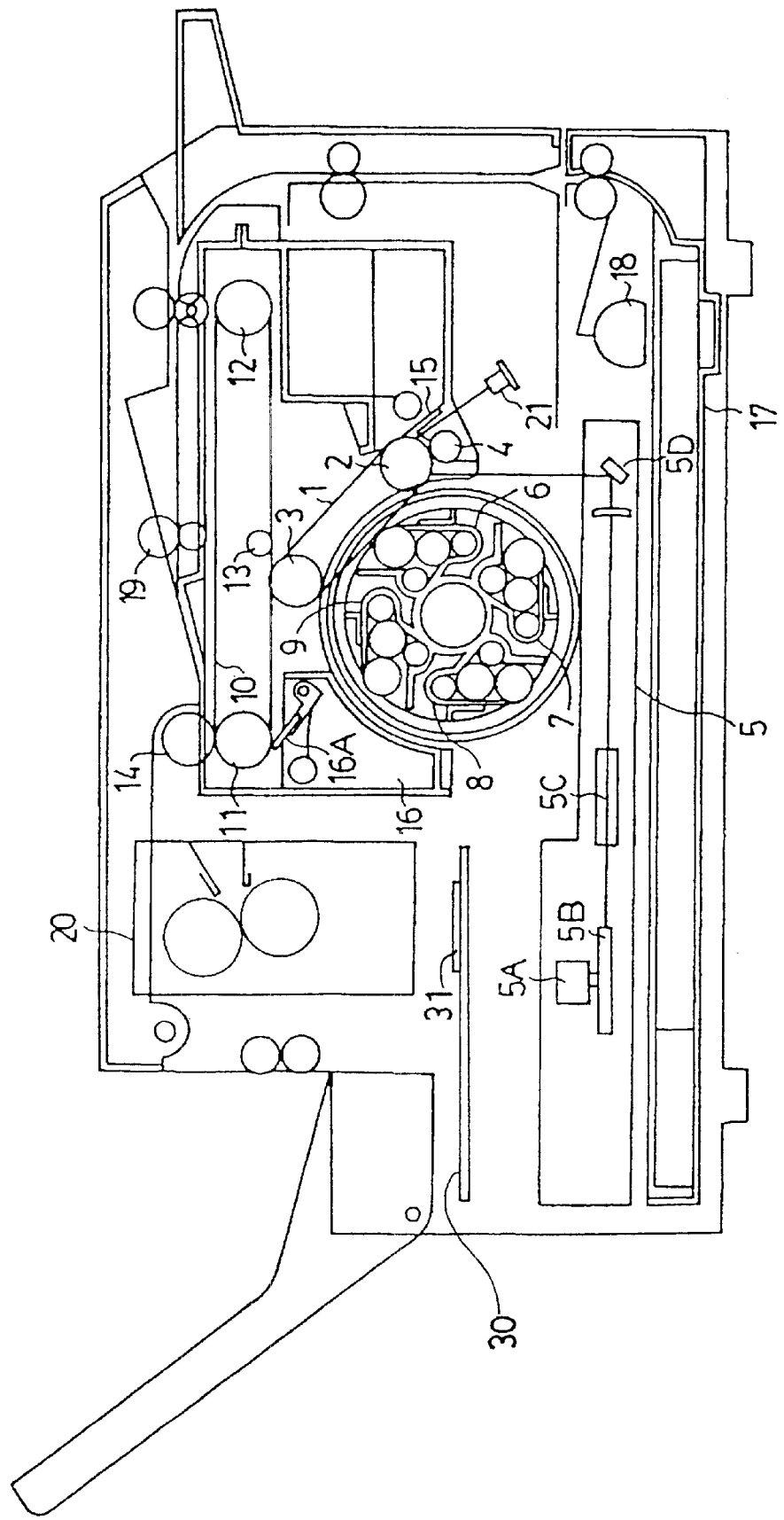
FIG. 1 is an illustration of a structure of an image forming apparatus according to a first embodiment of the present invention.

A description will now be given, with reference to FIG. 1, of a structure of an image forming apparatus according to a first embodiment of the present invention. FIG. 1 is an illustration of a structure of the image forming apparatus according to the first embodiment of the present invention.

In FIG. 1, a flexible belt-like photosensitive member 1 (hereinafter, referred to as a photosensitive belt 1) is drivingly provided between rollers 2 and 3 so that the photosensitive belt 1 carries an image and is rotated in the clockwise direction by being driven by the roller 2 or the roller 3. The image forming apparatus is provided with a charging member 4 as a charging means, a laser writing unit 5 as an image exposing means and developing units 6, 7, 8 and 9. Each of the developing units accommodates different specific color developers. The laser writing unit 5 has a holding case having a slit-like opening for exposure on a top surface thereof.

The charging member 4 and a photosensitive member cleaning unit 15 are provided near the roller 2. The cleaning unit 15 cleans the photosensitive belt 1. A laser beam emitted by the laser writing unit 5 is projected onto a portion of the photosensitive belt 1 adjacent to the roller 2.

The developing units 6, 7, 8 and 9 store a yellow developer, a magenta developer, a cyan developer and a black developer, respectively. Each of the developing units is provided with a developer sleeve which contacts or positions close to the photosensitive belt 1 so as to develop a latent image formed on the photosensitive belt 1 by a non-contact developing method or a contact developing method.

An intermediate transfer belt 10 is drivingly provided between rollers 11 and 12. A portion of the intermediate transfer belt 10 between the rollers 11 and 12 contacts the photosensitive belt 1 at a position of the roller 3 so that a first developed image formed on the photosensitive belt 1 is transferred to the intermediate belt 10 by an action of a bias roller 13 provided on an inner side of the intermediate transfer belt 10. By repeating the transfer process, a second image, a third image and a fourth image are sequentially superimposed on the first image on the intermediate transfer belt 10. The transfer process for superimposing these images is accurately performed so that an offset of each image does not occur.

A transfer roller 14 is provided so that the transfer roller contacts the intermediate transfer belt 10. A cleaning unit 16 is provided near the roller 11 so as to clean a surface of the intermediate transfer belt 10. It should be noted that a blade 16A of the cleaning unit 16 is maintained to be separate from the surface of the intermediate transfer belt 10 during an image forming operation, and is pressed against the surface of the intermediate transfer belt 10 when a cleaning is required after the transfer process is completed.

A color-image forming process in the image forming apparatus shown in FIG. 1 is performed as follows.

First, data is obtained by a color image data inputting unit (not shown in the figure) by scanning an original image. Then, the data is processed by an image data processing unit so as to generate image data, and the image data is temporarily stored in an image memory. The image data stored in the image memory is read when a recording operation for the image data is performed, and is input to the color image-image forming apparatus shown in FIG. 1.

That is, when a color signal is input to the laser writing unit 5, the laser writing unit 5 generates a laser beam. The laser beam is deflected by a polygon mirror 5B which is rotated by a drive motor. The laser beam deflected by the polygon mirror 5B passes through an fθ lens 5C, and is deflected by a mirror 5D so that the laser beam passes through the exposure opening. Then, the laser beam is projected onto the surface of the photosensitive belt 1 which is previously discharged by a discharging lamp 21 and uniformly charged by the charging unit 4, so as to form a static latent image.

The image pattern to be exposed on the photosensitive belt 1 is a color component image pattern obtained by separating the full-color image into each color component image such as a yellow component image, a magenta component image, a cyan component image and a black component image. Each latent image formed on the photosensitive belt 1 is developed by the respective developing units 6, 7, 8 and 9 so as to form developed color component images.

The thus-formed color component images on the photosensitive belt 1 is transferred onto the intermediate transfer belt 10 which is rotated in the counterclockwise direction while the intermediate transfer belt 10 is in contact with the photosensitive belt 1. Thereby, the color component images in yellow, magenta, cyan and black are transferred onto the intermediate transfer belt 10 so as to be superimposed thereon.

The superimposed color component images in yellow, magenta, cyan and black on the intermediate transfer belt 10 are transferred on a transfer sheet by the transfer roller 14. The transfer sheet is fed from a paper feed table 17 to a transferring area via a feed roller 18 and a register roller 19.

After the transfer operation is completed, the transfer sheet is passed through a fixing unit 20 so that the image on the transfer sheet is fixed, and a formation of a multi-color image is completed.

Figure 2:
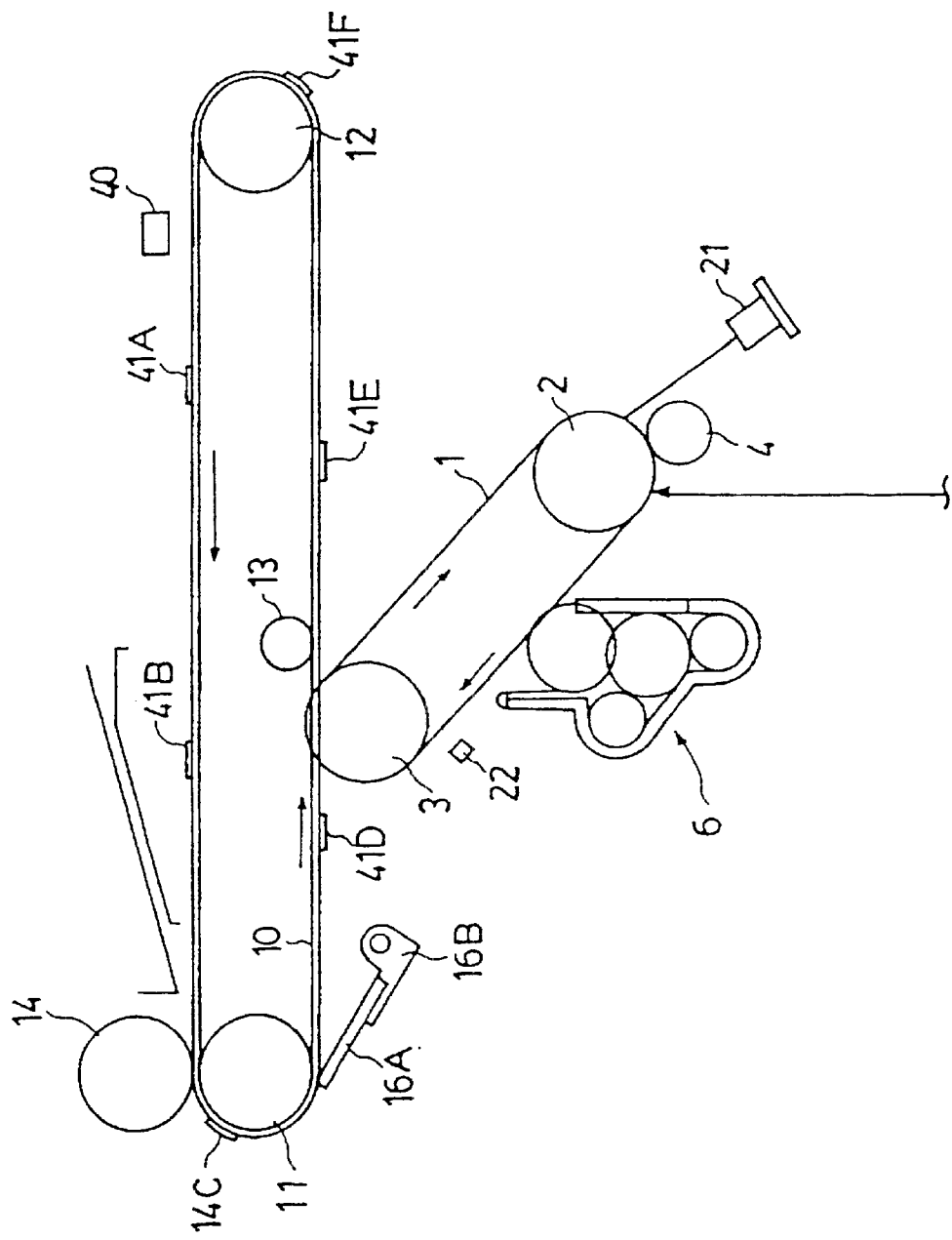
FIG. 2 is an enlarged view of a part of the image forming apparatus shown in FIG. 1.

FIG. 2 is an enlarged view of a part of the image forming apparatus including the photosensitive belt 1 and the intermediate transfer belt 10.

As shown in FIG. 2, six marks 41A, 41B, 41C, 41D, 41E and 41F are provided on a side portion of the intermediate transfer belt. One of the marks 41A to 41F is detected by a mark detecting sensor 40 when a writing operation is started. If the mark 41A, for example, is detected and a writing operation of the first color component image is started, a writing operation of a second color component image is started when the mark 41A makes a complete turn and is detected again by the mark detecting sensor 40.

When the mark 41A is detected as a start mark, signals output from the mark detecting sensor 40 detecting the remaining marks 41B to 41F are masked so that these signals are not used as a timing signal. The masking of the signals corresponding to the marks which are not used as the timing mark is performed by managing a number of marks.

A P sensor 22 is provided near a position slightly upstream of an area in which the photosensitive belt 1 contacts the intermediate transfer belt 10. The P sensor detects an amount of toner adhering to the photosensitive belt 1.

The above-mentioned operation of the image forming apparatus are controlled by an electronic control unit formed on a circuit board 30. The electronic control unit includes an arithmetic processing unit 31 which corrects pixel data so as to reproduce a good quality color image.

Figure 3:
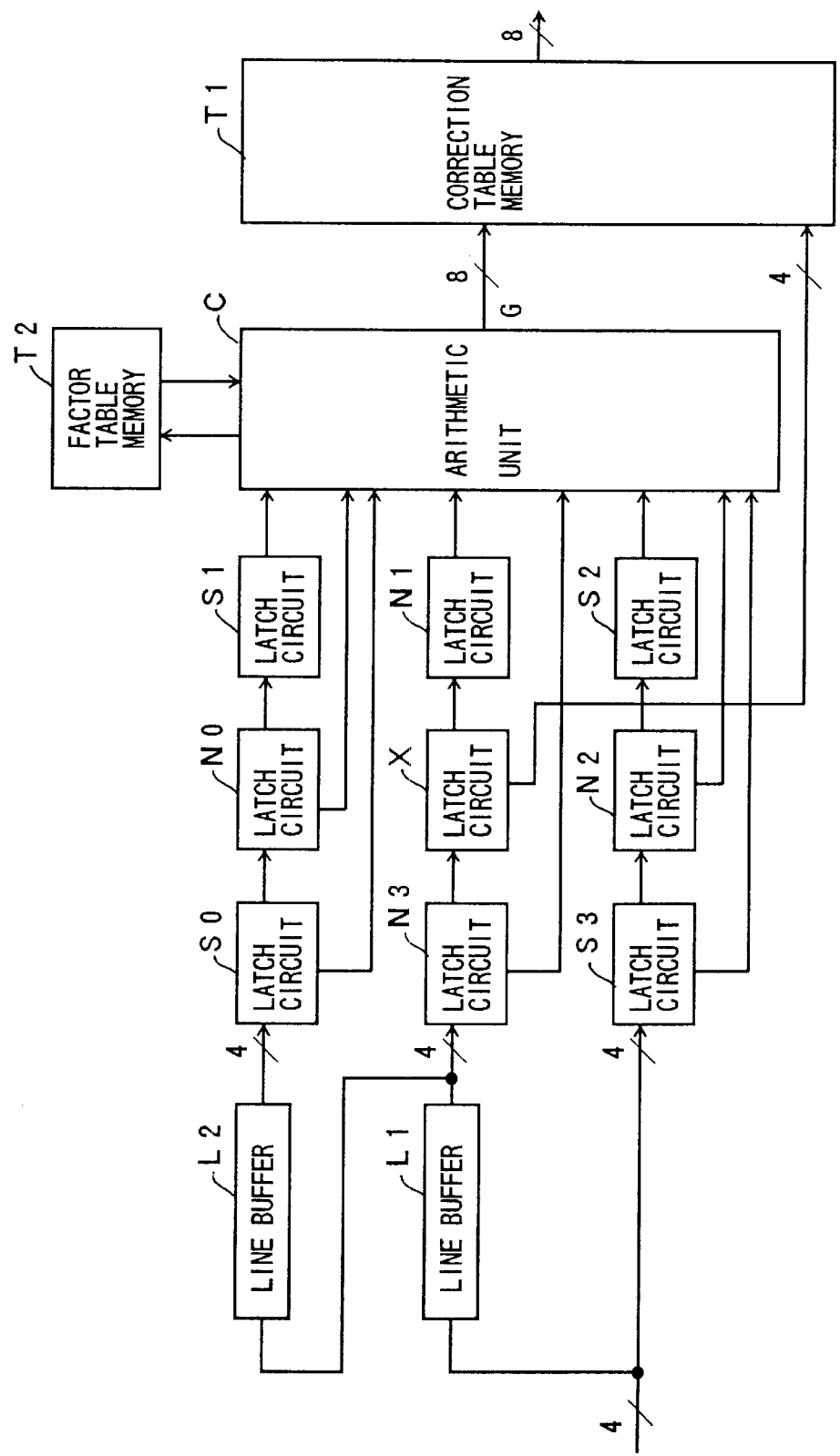
FIG. 3 is a block diagram of an arithmetic processing unit provided in the image forming apparatus shown in FIG. 1.

FIG. 3 shows a block diagram of the arithmetic processing unit 31 formed on the circuit board 30.

As shown in FIG. 3, the arithmetic processing unit 31 includes line buffers L1 and L2 each of which stores pixel data corresponding to a single scan line. The arithmetic processing unit 31 also includes latch circuits S0, S1, S2, S3, N0, N1, N2, N3 and X. Each of the latch circuits latches pixel data (4-bit data) corresponding to a single pixel. The latch circuits S0, S1, S2, S3, N0, N1, N2, N3 and X latch a set of pixel data corresponding to pixels (dots) arranged in a 3×3 matrix. The arrangement of the latch circuits shown in FIG. 3 corresponds to the arrangement of pixels (dots) of which pixel data is latched by the latch circuits.

In FIG. 3, the latch circuit X is located at the center of the latch circuits. The pixel data (dot data) latched by the latch circuit X corresponds to a pixel (dot) being subjected to a correction. Hereinafter, this pixel (dot) is referred to as a focused dot. The latch circuits N0 and N2 are arranged along a vertical direction with the latch circuit X located therebetween. The latch circuits N1 and N3 are arranged along a horizontal direction with the latch circuit X located therebetween. The latch circuits S0 and S2 are arranged in a diagonal direction with the latch circuit X located therebetween. The latch circuits S1 and S3 are arranged in another diagonal direction with the latch circuit X located therebetween. Accordingly, the latch circuits S0, S1, S2, S3, N0, N1, N2, N3 and X together form a 3×3 matrix which corresponds to the arrangement of pixels (dots) latched by the latch circuits. It should be noted that the latch circuits are arranged in the 3×3 matrix in FIG. 3 for the sake of convenience of description, and the latch circuits can be arranged in a different form, in practice, as long as they are connected as shown in FIG. 3 and as described later.

The arithmetic processing unit 31 also includes an arithmetic unit C, a factor table memory T2 and a correction table memory T1.

In the arithmetic processing unit 31, 4-bit pixel data which was subjected to the dither process is input to the latch circuit S3 and also input to the line buffer L1. An output of the line buffer L1 is input to the latch circuit N3 and also input to the line buffer L2. An output of the line buffer L2 is input to the latch circuit S0. That is, since each of the line buffers L1 and L2 stores pixel data corresponding to a single line, the latch circuits S3, N3 and S0 latches pixel data corresponding to three pixels (dots) each of which is extracted from a respective one of three consecutive lines at the same time.

Each pixel data latched by the latch circuits S0, N3 and S0 is shifted to the latch circuits N0, X and N2 in synchronization with a synchronization signal provided from an external circuit provided in the image forming apparatus. Similarly, each pixel data latched by the latch circuits N0, X and N2 is shifted to the latch circuits S1, N1 and S2 in synchronization with the synchronization signal.

The pixel data latched by each of the latch circuits S0, S1, S2, S3, N0, N1, N2 and N3 is input to the arithmetic unit C. On the other hand, the pixel data latched by the latch circuit X is input to an address input of the correction table memory T1.

The arithmetic unit C calculates a correction factor G based on the pixel data input from the latch circuits S0, S1, S2, S3, N0, N1, N2 and N3. Before calculating the correction factor G, the 4-bit pixel data input from each of the latch circuits S0, S1, S2, S3, N0, N1, N2 and N3 is converted into data s0, s1, s2, s3, n0, n1, n2 and n3 according to factor table information stored in the factor table unit T2. Then, the arithmetic unit C calculates the correction factor G based on the data s0, s1, s2, s3, n0, n1, n2 and n3 by using the following equation, where t is a number from 0 to 3, Gs is a factor corresponding to the data s0, s1, s2 and s3, and Gn is a factor corresponding to the data n0, n1, n2 and n3.

$$G=Gn\Sigma(nt-x)+Gs\Sigma(st-x)$$

According to the above-mentioned equation, a density level of the focused dot is corrected based on a difference in density level between the focused dot and the dots surrounding the focused dot. Additionally, a degree of correction is changed between the dots arranged in the horizontal and vertical directions with respect to the focused dot and the dots arranged in the diagonal directions. That is, the pixel data corresponding to the dots located in the diagonal directions with respect to the focused dot is corrected by a degree of correction different from that of the pixel data corresponding to the dots located in the horizontal and vertical directions with respect to the focused dot. For example, when a line image is formed, a width of a line extending in a diagonal direction tends to be smaller than a width of a line extending in a horizontal or vertical line. Accordingly, if the degree of correction for the pixel data corresponding to a diagonal line is increased, the diagonal line can be formed with the same thickness as a horizontal or vertical line. The factors Gs and Gn in the above-mentioned equation achieves such a change in the degree of correction between the horizontal and vertical directions and the diagonal directions.

Figure 4:
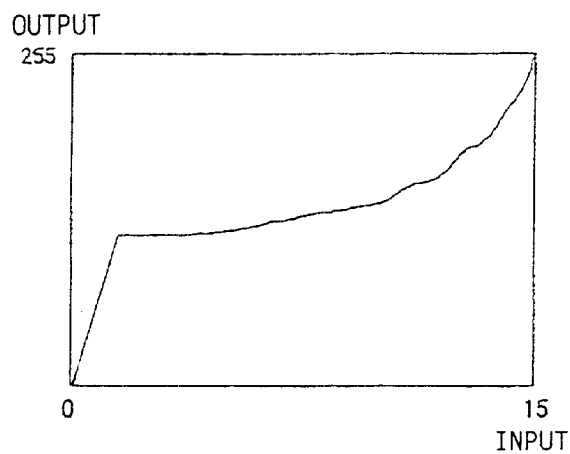
FIG. 4 is a graph corresponding to contents of factor table information stored in a factor table memory shown in FIG. 3.
Figure 5:
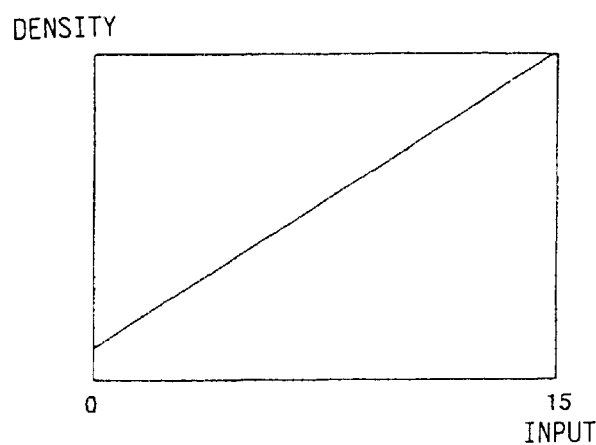
FIG. 5 is a graph showing a relationship between input pixel data and density of an image formed based on the input pixel data.

FIG. 4 is a graph which corresponds to contents of the factor table information stored in the factor table memory T2. The following Table 1 shows the content of the factor table information stored in the factor table memory T2. That is, values indicated in the table 1 are determined according to the graph of FIG 4. The values indicated in the Table 1 are determined so that density of an image formed according to the 4-bit pixel data input from each of the latch circuits is changed to the output values that form an image having a linear characteristic as shown in FIG. 5.

TABLE 1

| Input | Output |
| --- | --- |
| 0 | 0 |
| 1 | 77 |
| 2 | 78 |
| 3 | 81 |
| 4 | 83 |
| 5 | 87 |
| 6 | 92 |
| 7 | 98 |
| 8 | 105 |
| 9 | 114 |
| 10 | 126 |
| 11 | 142 |
| 12 | 161 |
| 13 | 185 |
| 14 | 216 |
| 15 | 255 |

Figure 6:
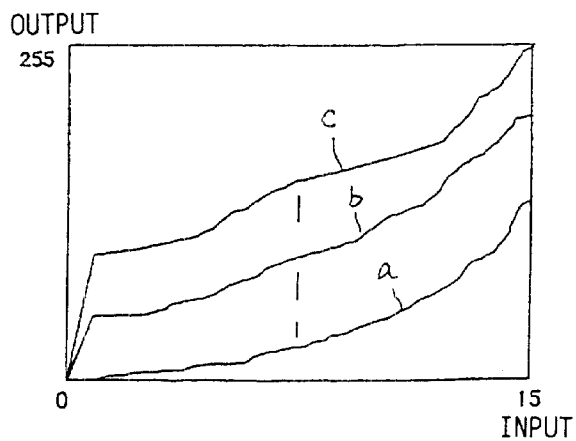
FIG. 6 is a graph showing contents of correction table information stored in a correction table memory shown in FIG. 3.

FIG. 6 is a graph showing contents of the correction table information stored in the correction table memory T1. In the graph shown in FIG. 6, the horizontal axis represents a value of the pixel data input from the latch circuit X which corresponds to the focused dot, and the vertical axis represents an output value output from the correction table memory Ti. It should be noted that the correction table information stored in the correction table memory T1 includes a plurality of sets of table information corresponding to characteristics a, b and c shown in FIG. 6. The table to be used is selected according to the correction factor G input from the arithmetic unit C.

As mentioned above, the correction table information stored in the correction table memory T1 contains previously calculated values with respect to the correction value G so that appropriately corrected pixel data of the focused dot is output from the correction table memory T1 when the pixel data of the focused dot and the correction factor G are input.

The corrected pixel data output from the correction table memory is stored in an image memory. Thereafter, the printing unit shown in FIG. 1 forms an image by using the pixel data stored in the image memory.

The present invention is not limited to the specifically disclosed embodiments, and variations and modifications may be made without departing from the scope of the present invention.

The present application is based on Japanese priority application No.9-302267 filed on Nov. 4, 1997, the entire contents of which are hereby incorporated by reference.

What is claimed is:

1. An image forming apparatus for forming a dot image having density gradation represented by a plurality of dots, said image forming apparatus comprising:

detecting means for detecting conditions of dots surrounding each dot in both a horizontal direction and a vertical direction in the dot image; and correcting means for correcting pixel data corresponding to each dot in accordance with a difference in a density level of the pixel data between said each dot and the dots surrounding said each dot in both said horizontal direction and said vertical direction, wherein said correcting means includes means for changing a degree of correction between the dots arranged in the horizontal and vertical directions with respect to said each dot and the dots arranged in the diagonal directions with respect to said each dot.

2. An image forming apparatus for forming a dot image having density gradation represented by a plurality of dots, said image forming apparatus comprising:

latch circuits each of which latches pixel data in both a horizontal direction and a vertical direction corresponding to each of the dots forming a 3×3 matrix, one of the dots positioned in the center of the 3×3 matrix being a focused dot;

an arithmetic unit calculating a correction factor based on the pixel data input from the latch circuits corresponding to pixels in both a horizontal direction and a vertical direction;

a correction table memory storing correction table information so as to correct the pixel data input from the latch circuit corresponding to the focused dot by using the correction factor input from said arithmetic unit; and a factor table memory storing factor table information referred to by said arithmetic unit, the factor table information being used for converting the pixel data input from the latch circuits to said arithmetic unit, wherein said arithmetic unit calculates the correction factor in accordance with the following equation:

$$G = Gn\Sigma(nt-x) + Gs\Sigma(st-x)$$

where G is the correction factor; Gn is a first predetermined factor for the pixel data corresponding to the dots located in the middle of each side of the 3×3 matrix; Gs is a second predetermined factor for the pixel data corresponding to the dots located on each corner of the 3×3 matrix; x is the pixel data corresponding to the focused dot; nt is the pixel data corresponding to the dots located in the middle of each side of the 3×3 matrix where t is a number form 0 to 3; and st is the pixel data corresponding to the dots located on each corner of the 3×3 matrix.

3. A method for forming a dot image having density gradation represented by a plurality of dots, said method comprising the steps of:

latching pixel data in both a horizontal direction and a vertical direction corresponding to each of the dots forming a 3×3 matrix, one of the dots positioned in the center of the 3×3 matrix being a focused dot;

calculating a correction factor based on the pixel data input from the latch circuits corresponding to pixels in both a horizontal direction and a vertical direction;

correcting the pixel data input from the latch circuit corresponding to the focused dot by using the calculated correction factor; and converting the pixel data corresponding to each of the dots other than the focused dot by using factor table information before calculating the correction factor, wherein a calculation of the correction factor is performed in accordance with the following equation:

$$G = Gn\Sigma(nt-x) + Gs\Sigma(st-x)$$

where G is the correction factor; Gn is a first predetermined factor for the pixel data corresponding to the dots located in the middle of each side of the 3×3 matrix; Gs is a second predetermined factor for the pixel data corresponding to the dots located on each corner of the 3×3 matrix; x is the pixel data corresponding to the focused dot; nt is the pixel data corresponding to the dots located in the middle of each side of the 3×3 matrix where t is a number form 0 to 3; and st is the pixel data corresponding to the dots located on each corner of the 3×3 matrix.

* * * * *